United States Patent
Barrett et al.

(10) Patent No.: US 8,290,803 B2
(45) Date of Patent: Oct. 16, 2012

(54) MIGRATION SYSTEM AND METHOD

(75) Inventors: Jennie Harrington Barrett, Manassas, VA (US); Hari Dev Garg, Geneva (CH)

(73) Assignee: International Business Machines Corporation, Armonk, NY (US)

( * ) Notice: Subject to any disclaimer, the term of this patent is extended or adjusted under 35 U.S.C. 154(b) by 1702 days.

(21) Appl. No.: 11/401,728

(22) Filed: Apr. 11, 2006

(65) Prior Publication Data

US 2007/0239500 A1   Oct. 11, 2007

(51) Int. Cl.
*G06Q 10/00* (2006.01)

(52) U.S. Cl. ............... 705/7.12; 705/7.11; 705/7.17; 705/7.22; 705/7.23; 705/7.27

(58) Field of Classification Search ............... 705/1, 7, 705/8, 9, 10, 7.11
See application file for complete search history.

(56) References Cited

U.S. PATENT DOCUMENTS

| | | | |
|---|---|---|---|
| 6,289,382 B1 * | 9/2001 | Bowman-Amuah | 709/226 |
| 6,604,110 B1 | 8/2003 | Savage et al. | |
| 6,662,357 B1 * | 12/2003 | Bowman-Amuah | 717/120 |
| 6,721,713 B1 * | 4/2004 | Guheen et al. | 705/1.1 |
| 6,895,382 B1 * | 5/2005 | Srinivasan et al. | 705/7 |
| 7,831,636 B2 * | 11/2010 | Wietlisbach et al. | 707/803 |
| 2002/0138320 A1 * | 9/2002 | Robertson et al. | 705/8 |
| 2002/0143599 A1 * | 10/2002 | Nourbakhsh et al. | 705/9 |
| 2003/0022696 A1 * | 1/2003 | Rosner | 455/564 |
| 2003/0055697 A1 * | 3/2003 | Macken et al. | 705/7 |
| 2004/0107125 A1 * | 6/2004 | Guheen et al. | 705/7 |
| 2004/0193515 A1 * | 9/2004 | Peterson et al. | 705/30 |
| 2005/0027696 A1 * | 2/2005 | Swaminathan et al. | 707/3 |
| 2007/0011209 A1 * | 1/2007 | Wietlisbach et al. | 707/200 |

OTHER PUBLICATIONS

Sapuntzakis, et al.; Optimizing the Migration of Virtual Computers; USENIX Association; 5th Symposium on Operating Systems Design and Implementation; pp. 377-390.

Beyer-Ebbesen, et al.; Migration Issues and Strategies for Token Ring; International Journal of Network Management, vol. 7; 1997; pp. 221-239; CCC 1055-7148/97/040221-19.

* cited by examiner

*Primary Examiner* — Leland Marcus
(74) *Attorney, Agent, or Firm* — Schmeiser, Olsen & Watts; John R. Pivnichny

(57) ABSTRACT

A migration system and method. The migration method comprises receiving a request to generate a migration plan for an entity and generating a strategic plan comprising a first procedure for transferring knowledge required for performing job functions comprised by a first set of individuals to a second set of individuals and a second procedure for defining a set of temporary individuals to perform a transition management process through the transferring. Additionally, an allocation plan and a ramping down plan are generated. The allocation plan is for allocating the set of temporary resources to the entity for the transition management process and second allocating said second set of individuals for the transferring. The ramping down plan is for ramping down to close out the set of temporary individuals based on external data. The resource migration plan is for supporting the entity and includes a procedure for allocating the second set of individuals for supporting the entity.

28 Claims, 11 Drawing Sheets

MIGRATION SYSTEM AND METHOD

BACKGROUND OF THE INVENTION

1. Technical Field

The present invention relates to a system and associated method for generating a migration plan.

2. Related Art

Due to a plurality of factors companies may periodically find it necessary to move operations from a current location to a secondary location. Generating a plan for moving operations from a current location to a secondary location is typically difficult and inefficient Therefore there exists a need for a simple and efficient method for generating a company plan for moving operations from a current location to a secondary location.

SUMMARY OF THE INVENTION

The present invention provides a migration method, comprising:

receiving, by a computing system, a request to generate a migration plan for an entity, said computing system comprising a memory unit, said memory unit comprising a migration planning tool suite including a management tool and a planning tool;

generating, by said planning tool, a strategic plan comprising a first procedure for transferring knowledge required for performing job functions comprised by a first set of individuals to a second set of individuals and a second procedure for defining a set of temporary individuals to perform a transition management process through said transferring;

generating, by said management tool, an allocation plan for first allocating said set of temporary individuals to said entity for said transition management process and second allocating said second set of individuals for said transferring;

generating, by said management tool, a ramping down plan for ramping down to close out said first set of individuals and said set of temporary individuals based on data extracted from a previous ramping down plan;

generating, by said planning tool, said migration plan for supporting said entity based on said strategic plan, said allocation plan, and said ramping down plan, said migration plan comprising a procedure for allocating said second set of individuals for supporting said entity.

The present invention provides a computing system comprising a processor coupled to a computer-readable memory unit, said memory unit comprising a migration planning tool suite including a management tool, a planning tool, and instructions that when executed by the processor implement a migration planning method, said method comprising;

receiving, by said computing system, a request to generate a migration plan for an entity;

generating, by said planning tool, a strategic plan comprising a first procedure for transferring knowledge required for performing job functions comprised by a first set of individuals to a second set of individuals and a second procedure for defining a set of temporary individuals to perform a transition management process through said transferring;

generating, by said management tool, an allocation plan for first allocating said set of temporary individuals to said entity for said transition management process and second allocating said second set of individuals for said transferring;

generating, by said management tool, a ramping down plan for ramping down to close out said first set of individuals and said set of temporary individuals based on data extracted from a previous ramping down plan;

generating, by said planning tool, said migration plan for supporting said entity based on said strategic plan, said allocation plan, and said ramping down plan, said migration plan comprising a procedure for allocating said second set of individuals for supporting said entity.

The present invention provides a computer program product, comprising a computer usable medium including computer readable program code embodied therein, said computer readable program code comprising an algorithm adapted to implement a migration planning method within a computing system, said method comprising:

receiving, by said computing system, a request to generate a migration plan for an entity;

generating, by said planning tool, a strategic plan comprising a first procedure for transferring knowledge required for performing job functions comprised by a first set of individuals to a second set of individuals and a second procedure for defining a set of temporary individuals to perform a transition management process through said transferring;

generating, by said management tool, an allocation plan for first allocating said set of temporary individuals to said entity for said transition management process and second allocating said second set of individuals for said transferring;

generating, by said management tool, a ramping down plan for ramping down to close out said first set of individuals and said set of temporary individuals based on data extracted from a previous ramping down plan;

generating, by said planning tool, said migration plan for supporting said entity based on said strategic plan, said allocation plan, and said ramping down plan, said migration plan comprising a procedure for allocating said second set of individuals for supporting said entity.

The present invention provides a process for integrating computing infrastructure, comprising integrating computer-readable code into a computing system, wherein the code in combination with the computing system is capable of performing a migration planning method within a computing system, said method comprising:

receiving, by said computing system, a request to generate a migration plan for an entity;

generating, by said planning tool, a strategic plan comprising a first procedure for transferring knowledge required for performing job functions comprised by a first set of individuals to a second set of individuals and a second procedure for defining a set of temporary individuals to perform a transition management process through said transferring;

generating, by said management tool, an allocation plan for first allocating said set of temporary individuals to said entity for said transition management process and second allocating said second set of individuals for said transferring;

generating, by said management tool, a ramping down plan for ramping down to close out said first set of individuals and said set of temporary individuals based on data extracted from a previous ramping down plan;

generating, by said planning tool, said migration plan for supporting said entity based on said strategic plan, said allocation plan, and said ramping down plan, said migration plan comprising a procedure for allocating said second set of individuals for supporting said entity.

The present invention advantageously provides a system and associated method for generating a company plan for moving operations from a current location to a secondary location

DETAILED DESCRIPTION OF THE INVENTION

Figure 1:
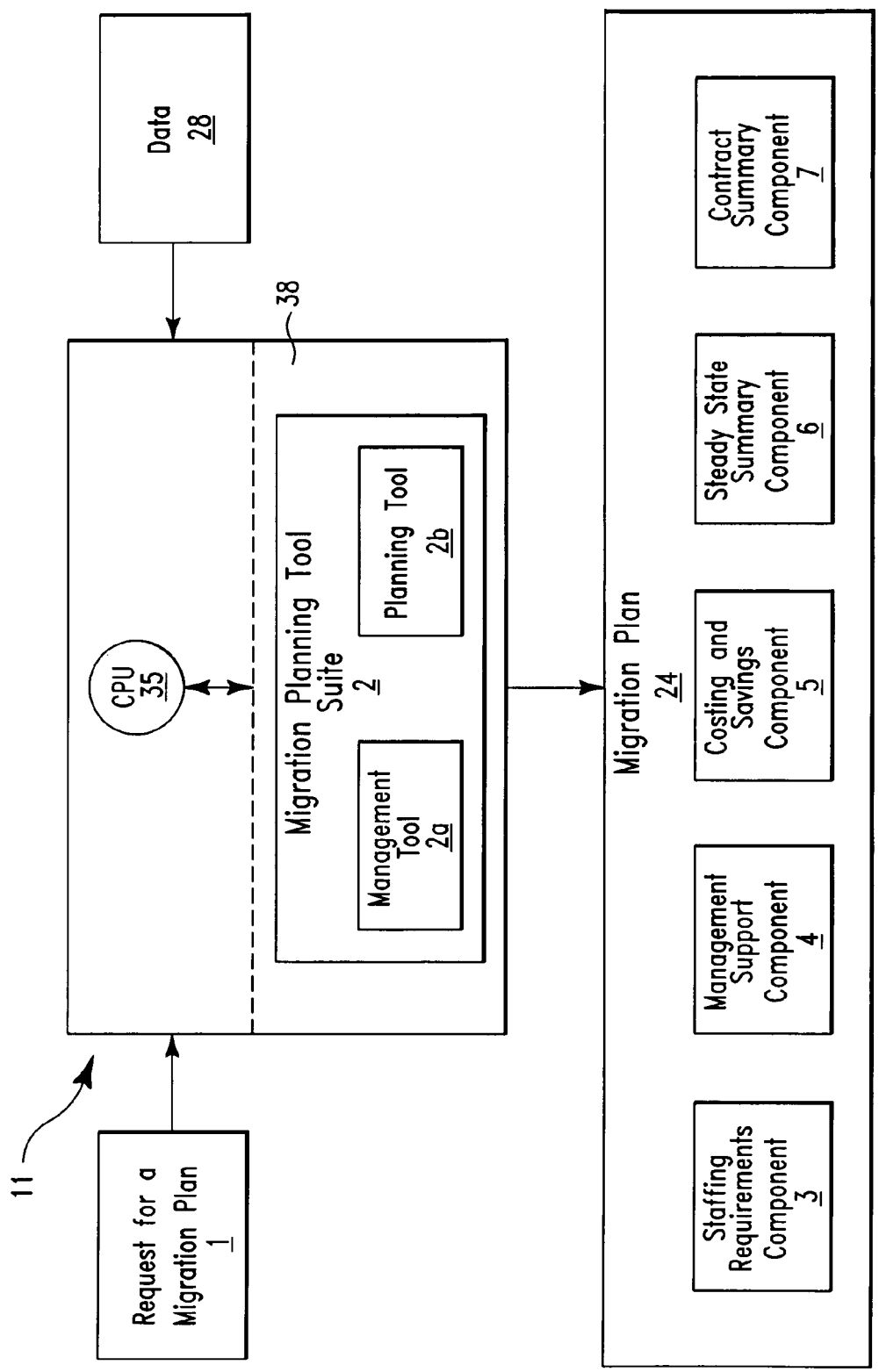
FIG. 1 illustrates a block diagram view of a computing apparatus comprising a migration planning tool suite for generating a migration plan, in accordance with embodiments of the present invention.

FIG. 1 illustrates a block diagram view of a computing apparatus 11 comprising a migration planning tool suite 2 for generating a migration plan 24, in accordance with embodiments of the present invention. The migration plan 24 comprises a detailed plan for delivering a movement or migration of knowledge required for performing job functions (e.g., knowledge related to performing business functions, knowledge related to performing IT functions, etc) from one group or groups of individuals (e.g., employees) to another group or groups of individuals (e.g., employees). An individual is defined herein as a person or people that provide and/or perform support functions or job duties (e.g., business support functions, IT support function, etc) for an entity (e.g., an organization, a business, etc.). The migration plan 24 provides a plan for an entity (e.g., an organization, a business, etc.) that is considering outsourcing their current local support staff (i.e., employees or individuals) from their control into a model that is supported by a remote support staff (i.e., employees or individuals) for the entity or a second entity (e.g., an organization, a business, etc.) and the second entity's world wide delivery partners. The migration plan 24 establishes a strategy to be followed, execution and milestone plans, a cost for execution, and resulting changes to the entity at completion of executing the migration plan 24 from a local support staff to a remote support staff. The term "Local" pertains to land within a local geographical area that consists of at least one country. Examples of local geographical areas include, inter alia, United States, United States and Canada, Czech Republic and Slovakia and Hungary, etc.). Thus, a local geographical area may consist of one country (e.g., United States), a plurality of countries, etc. The local geographical area of United States and Canada is an example of local geographical area consisting of a plurality of North America Free Trade Agreement (NAFTA) countries. The local geographical area of Czech Republic and Slovakia and Hungary is an example of local geographical area consisting of a plurality of European Union (EU) countries. As examples of "local", Illinois and Alaska are local for an embodiment in which the local geographical area consists of the United States. If the local geographical area consists of one country (i.e., no less and no more than one country), then the "local" land within the one country may be called "onshore" land within the one country. For example, land within the United States is an example of "onshore" land within the United States for an embodiment in which the local geographical area consists of the United States. As another example, land within Canada is an example of "onshore" land within Canada for an embodiment in which the local geographical area consists of Canada. The term "Remote" pertains to land external to (i.e., outside of) the local geographical area, including land having a border in common with an exterior border of the local geographical area. For example, Mexico and India are remote if the local geographical area consists of the United States. If the local geographical area consists of one country, then the "remote" land outside of the one country may be called "offshore" land outside of the one country. For example, if the local geographical area consists of United States, then the remote land may consist of Brazil. As another example, if the local geographical area consists of Spain, then the remote land may consist of India.

The computing apparatus 11 comprises a central processing unit (CPU) connected to a memory device 38. The computing apparatus 11 may comprise any type of computing apparatus known to a person of ordinary skill in the art including, inter alia, a personal computer, a server or servers, a lap top computer, etc. The memory device 38 comprises migration planning tool suite 2. The migration planning tool suite 2 comprises a management tool 2a and a planning tool 2b. The migration planning tool suite 2 is a software application that is used to generate the migration plan 24. The migration planning tool suite 2 generates a migration plan for a current or proposed entity (e.g., a business) wanting to transition knowledge comprised by individuals from an existing model into a new global model with standard output. When an entity (e.g., a business) decides to investigate an impact of migrating or transitioning their support staff from a current operating model (i.e., a process for supporting entity functions) to a distributed or global model (i.e., a process for supporting entity functions in a distributed world wide support team) for delivering services (i.e., either within their own remote partnership or with a second company), a request 1 is made for generating a migration plan 24. The request 1 may be made by management personal associated with the entity. The request 1 is executed by the computing apparatus 11. The migration planning tool suite 2 generates the migration plan 24 in response to the request 1. The migration planning tool suite 2 allows an individual or party to input all necessary information (e.g., data 28) for generating the migration plan 24. The migration planning tool suite 2 utilizes a standard global resource migration methodology or models (i.e., a set of proven and defined processes and procedures that support the movement of the support from one group of individuals to another) to develop a business case (i.e., assessing financial impacts for the migration plan 24) to transition individual as a business requirement and basis for the business rules (i.e., logical and business processing required by the defined global resource migration methodology) embedded within the code (i.e., code embedded within the resource planning tool suite 2). Generating solutions for transitioning knowledge vary for various entities so therefore the migration planning tool suite 2 comprises the ability to generate a migration plan 24 based on a plurality of factors. The migration planning tool suite 2 may use many different migration models and combinations of models as input for generating the migration plan 24. The migration methodology or models which may be embedded within the code (i.e., code for the migration planning tool suite 2) comprises a repeatable process that allows for training and transition of knowledge (i.e., related to performing job functions) from an existing individual(s) to a new performing individual(s). The migration planning tool suite 2 requires a user to define existing staffing (i.e., individuals) levels which are currently supporting the entity (e.g., a business). The current staffing (i.e., individuals) and existing business costs make up the current entity needs and model. The migration planning tool suite 2 generates scripted questions to enable the user to provide all necessary data to obtain an initial migration plan 24. The migration planning tool suite 2 then uses additional business knowledge to assist in defining a time to transition and how to transition (i.e., perform a transition management process) the knowledge from the currently required individuals(s) to the new performing individuals(s) to complete a migration strategy. As the user steps through the scripted questions, they are either provided an immediate error response or are presented with a next scripted question. Some data may be visible or accessible based on the answers or data already provided. The migration planning tool suite 2 comprises software tools (e.g., management tool 2a, planning tool 2b, etc) for analyzing data entered, edited, and collected for a request to generate a business solution (i.e., a migration plan 24). The migration planning tool suite 2 analyzes the attributes, relationships, business rules, and embedded methodology to define a migration strategy and create a solution (i.e., a migration plan 24). The migration plan 24 may comprise a plurality of components including, inter alia, a staffing requirement component 3, a management support component 4, a costings and savings component 5, a steady state summary component 6, and a contract summary component 7. The staffing requirement component 3 provides an overall staffing requirement for executing the migration plan 24. Staffing requirement details may include a fulfillment rate (i.e., a rate for completing a process comprising identifying, interviewing, selecting, and hiring an individual) for the individuals based on a calendar or schedule required. The staffing requirement component 3 may include an experience level of the individual, a partner that is to provide the individual, and a location for placement of the individual (e.g., local customer site, a remote location, etc). The management support component 4 comprises a result based on inputting project management reports detailing staffing, project plans, and critical milestones that are generated from a defined solution. The costing and savings component 5 comprises a component that further supports the project management reports by providing details to be used as part of the business case as well as all funding details necessary for executing the migration plan 24. All cost/benefit analysis are included in the costing and savings component 5. The costing and savings component 5 may be used to support financial tracking through out execution of the migration plan 24. The steady state summary component 6 comprises results that provide details of an impact to the transitioned individuals at the completion executing the migration plan 24. The steady state summary component 6 generates a report comprising a point at which all of the original resources supporting the entity functions are no longer required and the new resources have become productive and responsible for supporting the entity functions. The contract summary component 7 provides a snap shot and report card of a final state for a contract or customer impact.

Figure 2:
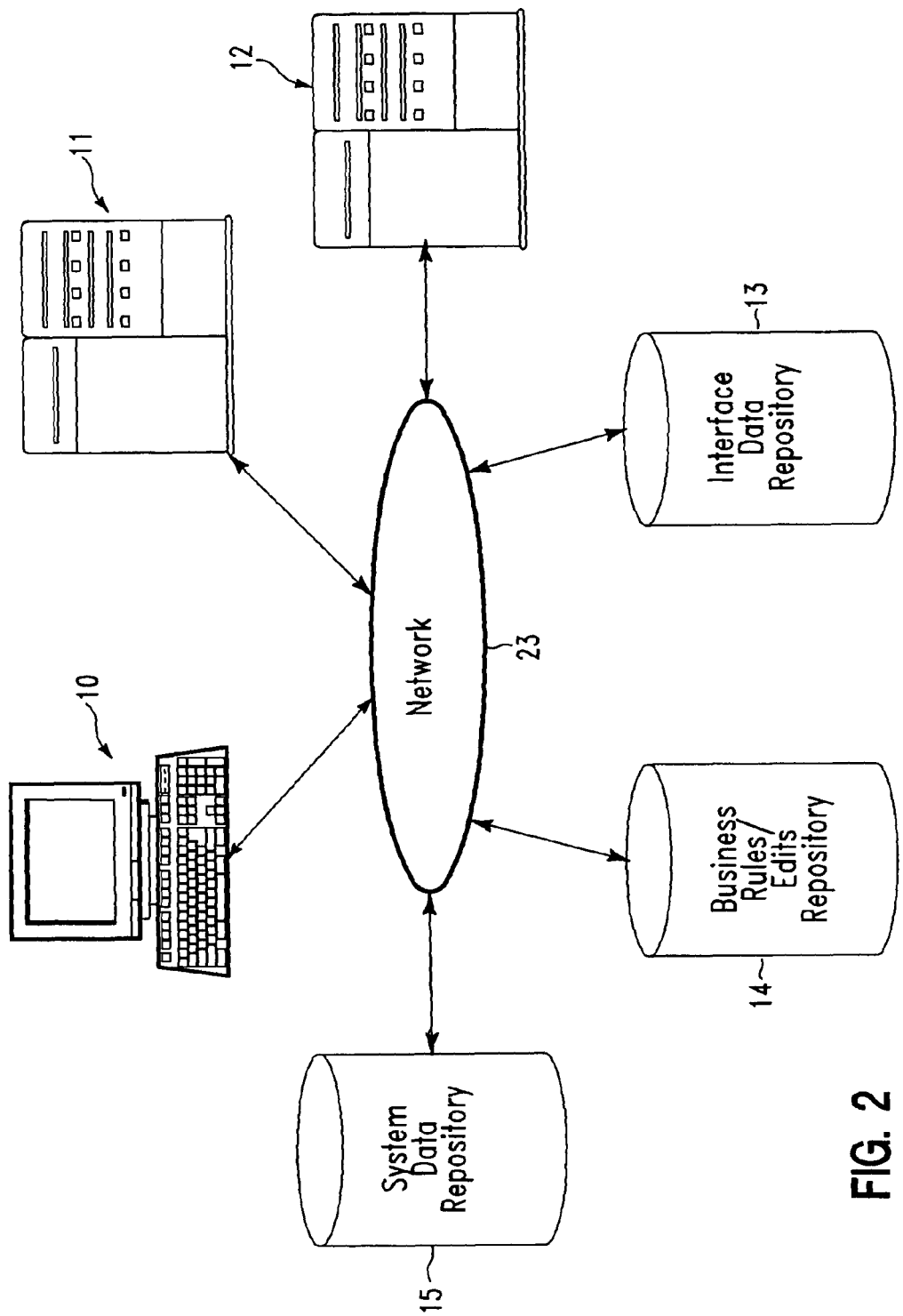
FIG. 2 illustrates a schematic diagram representing a system for supporting the migration planning tool suite of FIG. 1, in accordance with embodiments of the present invention.

FIG. 2 illustrates a schematic diagram representing a system 22 for supporting the migration planning tool suite 2 of FIG. 1, in accordance with embodiments of the present invention. The system comprises a graphical user interface 10, computing apparatus 11, a messaging server 12, an interface data repository 13, a business rules/edits repository 14, a system data repository 15, and a network 23 (e.g., the Internet, a local area network, a wide area network, etc) connecting the aforementioned components. The graphical user interface 10 comprises a computing device for accepting user data input necessary for generating the resource migration plan 2. The user data may be entered through, inter alia, a protected input worksheet, a visual basic editor, etc. The computing apparatus 11 comprises the migration planning tool suite 2 for logically processing user data input entered through the graphical user interface 10. The messaging server 12 provides logical processing of messages and calculating worksheets between user provided functions and drivers. The interface data repository 13 comprises data worksheets that may be manually uploaded and distributed to the interfacing user or system. The business rules/edits repository 14 comprises business rules. The system data repository 15 comprises generated worksheets and tables presented in a visual view but stored and created using specified files.

Figure 3:
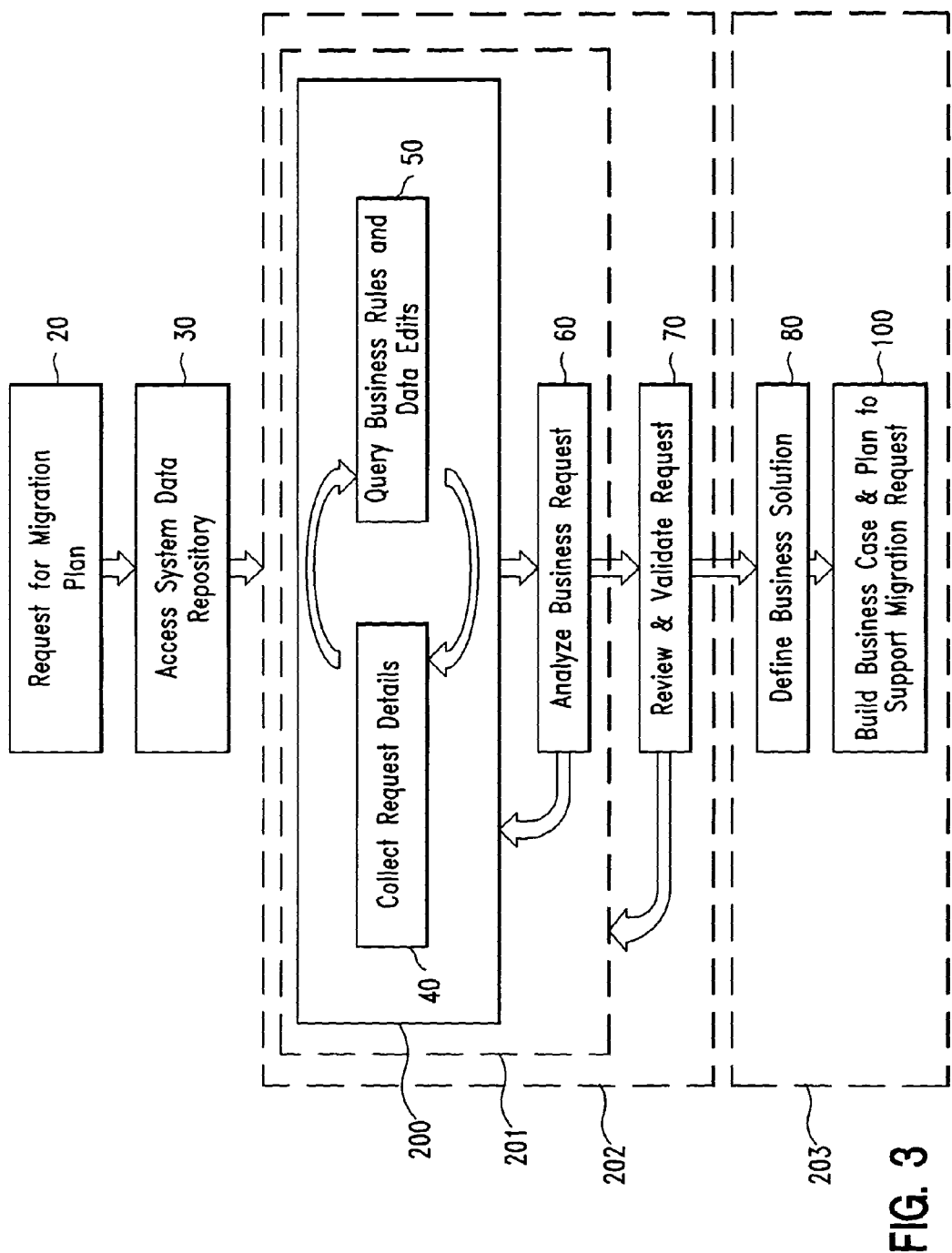
FIG. 3 is a flowchart illustrating an algorithm describing high level functions that are performed by the migration planning tool suite 2 of FIGS. 1 and 2, in accordance with embodiments of the present invention.

FIG. 3 is a flowchart illustrating an algorithm describing high level functions that are performed by the migration planning tool suite 2 of FIGS. 1 and 2, in accordance with embodiments of the present invention. In step 20, a request is made to generate a migration plan 2. The request comprises a process of initiating and generating a standard approach to building a business case and solution for a remote location engagement. A remote location engagement is defined herein as an act of moving knowledge and support from a current or existing group of individuals to a remote or alternate group of individuals. Upon initiating the request in step 20, the migration planning tool suite 2 will present a user with necessary questions to prepare and automatically generate a full staffing plan with cost analysis and savings summaries for a business scenario to support an entity's request to migrate knowledge (e.g., processing and support) to an alternate global delivery model (i.e., delivery support in a distributed world wide support team). In step 30, the migration planning tool suite 2 provides access to a system data repository 15 (see FIG. 2). Launching and accessing the system data repository 15 comprises a process of bringing up a version of the migration planning tool suite 2 to be used to support a user's (i.e., for the entity or business) request. In step 40, the migration planning tool suite 2 performs a collect request details function. The collect request details function comprises a process of presenting an input screen and scripted questions to the user to allow for the data entry of all attributes known to support the business scenario being analyzed. An initial set of baseline questions are grouped and presented to the user with an adjustable flow of varying questions depending upon the answers and content of questions already presented. In step 50, the migration planning tool suite 2 queries the business rules/edits repository 14 (see FIG. 2). The migration planning tool suite 2 queries the business rules/edits repository 14 for every attribute entered by the user to ensure that format, content, and data relationships meet requirements set by the business rules of the migration planning tool suite 2 and methodology. In step 60, an analyze business request function is performed. The analyze business request function comprises a process of further reviewing and editing strategy details determined to be necessary to support the solutioning of the business need. The process is repeatable for each receiving or delivery partner that has been named to be the performing individuals at the completion of the transition and migration (i.e., the migration plan 2). The process comprises an interactive process where the migration planning tool suite 2 provides feedback, errors, and warnings to the user as the situation to do so is encountered. In step 70, a validate request function is performed. The validate request function comprises a process for expanding the business rules validation from format and content to an overall business problem and its solution. All remaining and uncorrected error or warning situations that still exist are represented to the user. For data that is considered to be valid, the resulting business solution is determined and compared to expected or desired steady state results. Any newly determined variances and errors are presented to the user. The validate request function is an interactive step process between the user and the business rules/edits repository. In step 100, a build business case and plan function is performed. The build business case and plan function comprises background functions that are executed to develop the full business case necessary to represent the solution to the defined business need and resulting strategy. In step 200 (i.e., comprising steps 40 and 50), each attribute that is requested is entered as part of the solutioning process and the necessary code set and format edits are performed. As errors are encountered, the user is provided a message. In step 201, business relationships across attributes are edited and validated. As data groupings are entered as a partner tranche (i.e., group of individuals that have been collected into a similar migration strategy and schedule), and phase levels (a group of processing), the data groupings are validated against business rules to ensure that the data as it stands and as it relates to other groupings are logical and meet set standards. As errors are encountered, the user is provided a message. In step 202, a request is edited and validated. As data has been entered, edited, and collected, the overall resulting request is validated and compared to the expected results to ensure the solution meets the delivery needs. As errors are encountered, the user is provided a message. In step 203, the request is processed. After the request has been entered, edited, collected, and validated a background process is performed to complete the request by defining the business solution.

Figure 4:
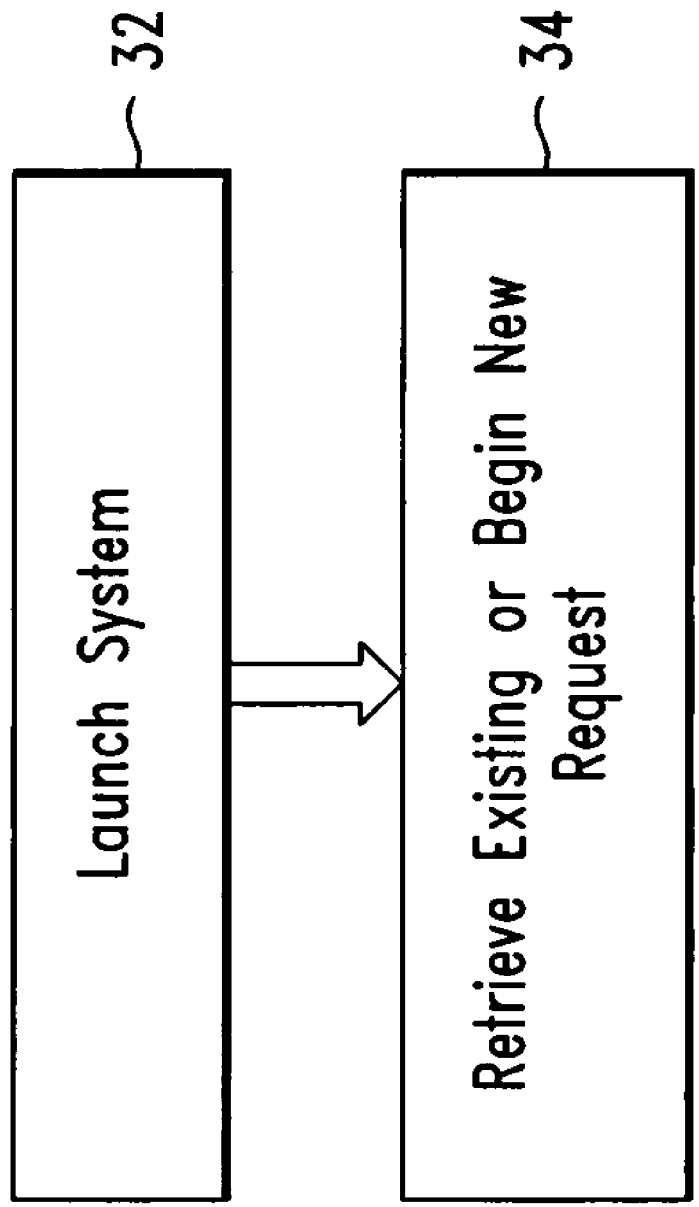
FIG. 4 is a flowchart illustrating embedded functions further detailing the access data repository step of FIG. 3, in accordance with embodiments of the present invention.

FIG. 4 is a flowchart illustrating embedded functions further detailing step 30 (i.e., access data repository) of FIG. 3, in accordance with embodiments of the present invention. In step 32, the migration planning tool suite 2 launches a specified version of executable code comprising a desired platform to support the transition request. In step 34, the migration planning tool suite 2 will either retrieve a request that had been generated and saved or begin a new request.

Figure 5:
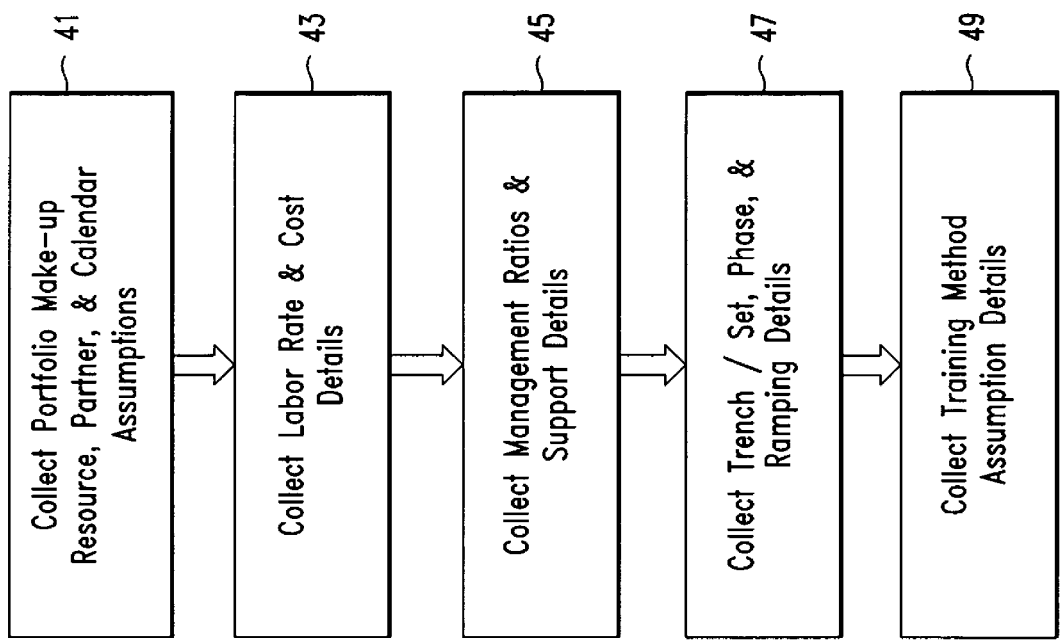
FIG. 5 is a flowchart illustrating embedded functions further detailing the collect request details step of FIG. 3, in accordance with embodiments of the present invention.

FIG. 5 is a flowchart illustrating embedded functions further detailing step 40 (collect request details) of FIG. 3, in accordance with embodiments of the present invention. In step 41, portfolio make-up individuals, partner, and calendar assumptions are collected. The migration planning tool suite 2 presents scripted questions to the user and collects the current required model and projected mix of the individuals being presumed to support a steady state (i.e., a point at which all of the original individuals supporting the business functions are no longer required and the new individuals have become productive and responsible for the processes.) result of the request. The information collected includes a targeted mix of individual type within each named and defined partner to support the transition and an assumed and targeted calendar that is projected to cover the complete execution of the transition request. In step 43, the migration planning tool suite 2 collects (i.e., through the scripted questions to the user) current and projected labor mix, labor rate, and other detailed cost information required to support the investment needs for the development of a cost model generated to support a business scenario when the strategy is developed and finalized. In step 45, the migration planning tool suite 2 allows the user to over ride necessary management ratios (i.e., a number of individuals a manager is required to support) to carry the individuals through the transition and into steady state. The migration planning tool suite 2 collects (i.e., through the scripted questions to the user) details supporting any necessary preplanning and process analysis calendar and individual needs. In step 47, the migration planning tool suite 2 collects (i.e., through the scripted questions to the user) ramping information. For each identified business partner, the user may enter and over ride any necessary migration strategy details for each individual and individual grouping identified to be transitioned including, inter alia, a targeted schedule, a number of individuals, timing of the ramping up and ramping down of individuals, etc. Ramping up is defined herein as a rate at which individuals are brought "onboard" to participate in knowledge transfer and pilots. Ramping down is defined herein as a rate at which the current individuals are reduced as the new individuals become productive. In step 49, training method assumption details are collected (i.e., through the scripted questions to the user). For each identified partner, the user may enter and over ride any necessary knowledge transfer methodology strategy details for each individual and individual grouping identified to be transitioned.

Figure 6:
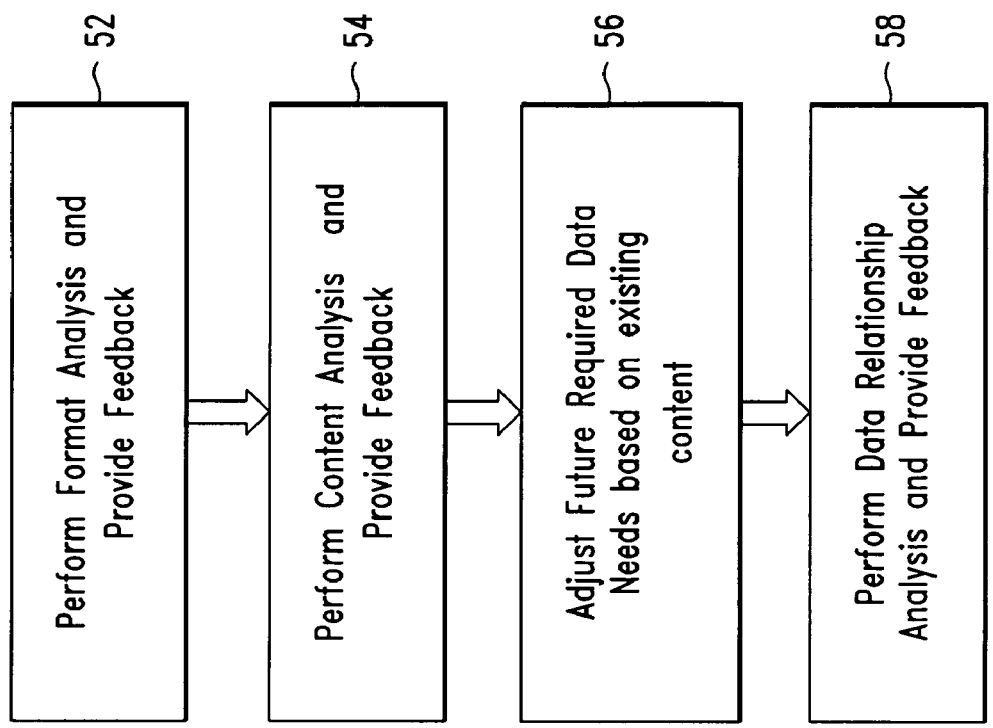
FIG. 6 is a flowchart illustrating embedded functions further detailing the query business rules and data edits step of FIG. 3, in accordance with embodiments of the present invention.

FIG. 6 is a flowchart illustrating embedded functions further detailing step 50 (i.e., query business rules and data edits) of FIG. 3, in accordance with embodiments of the present invention. In step 52, the migration planning tool suite 2 performs a format analysis for each data attribute entered by the user ensuring that the free form text entered through the migration planning tool suite 2 meets the specified format requirements. Additionally, data entered is validated against an attribute data type defined format. If format errors are discovered, the user is immediately presented with an error message. In step 54, the migration planning tool suite 2 performs a content analysis for each data attribute entered by the user ensuring that the free form text entered through the migration planning tool suite 2 meets the content requirements. Data entered is validated against code set values identified for that particular attribute. If content errors are discovered, the user is immediately presented with an error message. In step 56, the migration planning tool suite 2 modifies future required data needs based on existing content. The visible scripted questions to the users are modified in order to collect additional variable data attributes needed based on content of already collected data from the user. In step 58, the migration planning tool suite 2 performs a data relationship analysis and provides feedback. As data is entered, edited, and collected, cross attribute data relationships are analyzed and verified to ensure they meet the business rules defined by the methodology. If an invalid or incomplete data relationship is detected, an error message and feedback comments are presented back to the user for review and correction.

Figure 7:
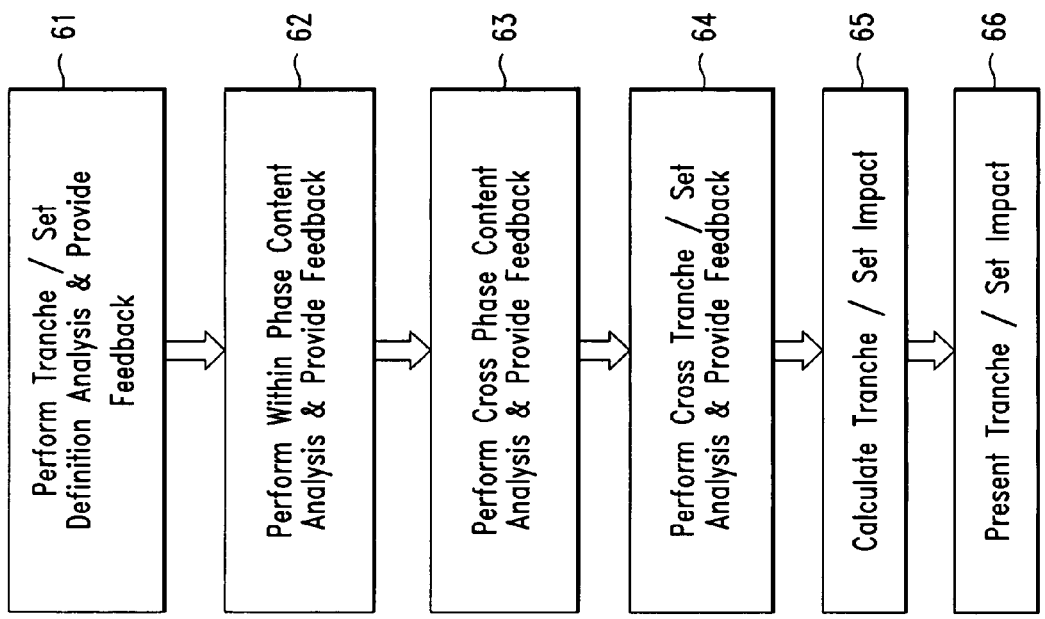
FIG. 7 is a flowchart illustrating embedded functions further detailing the analyze business request step of FIG. 3, in accordance with embodiments of the present invention.

FIG. 7 is a flowchart illustrating embedded functions further detailing step 60 (i.e., analyze business request) of FIG. 3, in accordance with embodiments of the present invention. In step 61, the migration planning tool suite 2 performs a tranche/set definition analysis and provides feedback. For each tranche that has been identified to support a grouping of individuals to be migrated to a delivery partner a definition analysis is generated. An overall tranche definition must fall in line with the previously entered, edited, and collected request and attribute data. Additionally, business analysis and methodology validation is performed against the set definitions. If an invalid situation is encountered, an error or warning message is formatted and presented to the user. In step 62, each phase named to be needed to support each tranche grouping of individuals to be migrated to a delivery partner is edited. The phase details are validated against the business rules defining that phase's restrictions and requirements. If an invalid situation exists within that set and phase attribute grouping, an error or warning message is formatted and presented to the user. In step 63, the migration planning tool suite 2 performs a cross phase content analysis and provides feedback. A cross phase content analysis is performed for each tranche or set that has been identified to support grouping of individuals to be migrated to a delivery partner and each phase named to be needed to support the migration. The bridge and relationship between each phase within a specific tranche or set must meet logical business rules to ensure that a valid strategy definition can be created to support that set for that delivery partner. If an invalid situation is encountered, an error or warning message is formatted and presented to the user. In step 64, the migration planning tool suite 2 performs a cross tranche/set analysis and provides feedback. For each delivery partner identified to support a grouping of individuals, validation of the relationship of each tranche or set defined as being necessary is performed. For that delivery partner, the cross tranche or set relationships must fall within the restrictions of that partner as well as logically fit the required engagement details that have already been entered, edited, and collected. If an invalid situation for that delivery partner and the defined set and phase combinations is encountered, the appropriate error or warning message is formatted and presented to the user. In step 65, tranche impacts are calculated. For each Delivery Partner and Set Groupings combinations, the valid steady state resulting impact is calculated. The phase definitions are applied to the set details to determine the steady state impact to the individual groupings. In step 66, a tranche/set impact is presented. For each delivery partner and set groupings, a resulting steady state impact to the individuals groups are formatted and presented to the user.

Figure 8:
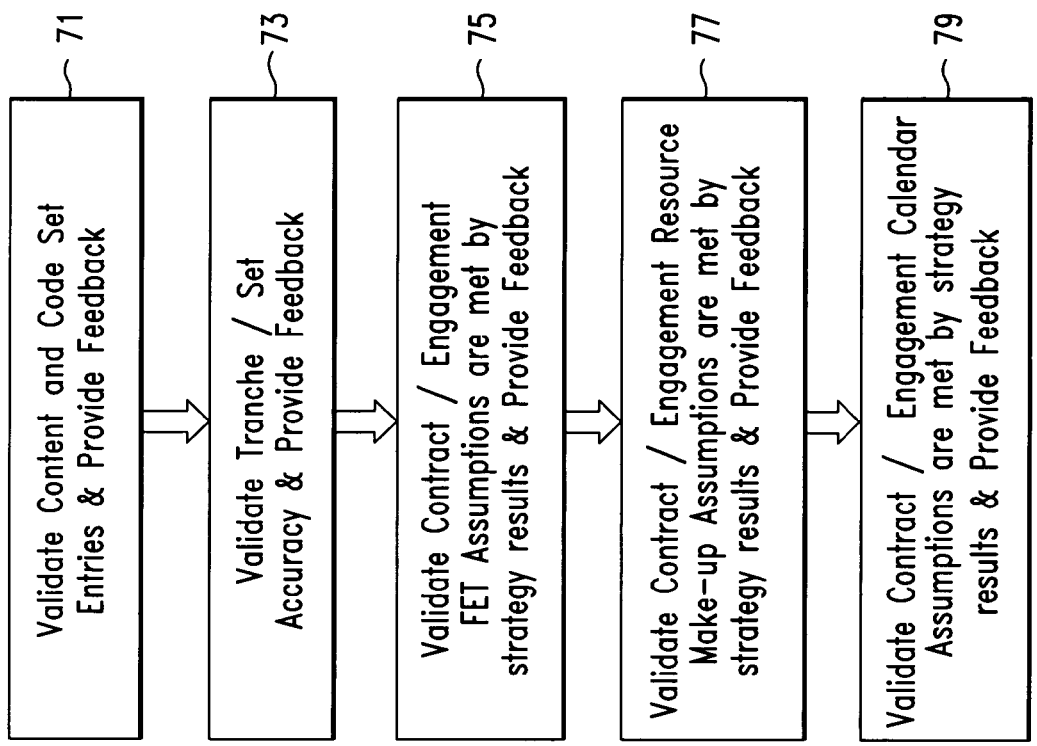
FIG. 8 is a flowchart illustrating embedded functions further detailing the validate request step of FIG. 3, in accordance with embodiments of the present invention.

FIG. 8 is a flowchart illustrating embedded functions further detailing step 70 (i.e., validate request) of FIG. 3, in accordance with embodiments of the present invention. In step 71, the migration planning tool suite 2 validates content and code set (i.e., a list of values comprising a data attribute) entries and provides feedback. All data attributes that are required to support the solution to the business problem are validated against the format (i.e., required layout for an attribute), code set, and business rule requirements. For each invalid attribute, a necessary detailed warning and error message is presented to the user. In step 73, the migration planning tool suite 2 validates tranche/set accuracy and provides feedback. For each delivery partner, set of individuals, and transition phases, the migration planning tool suite 2 a validation accuracy of content and logic. If an invalid situation is encountered, a necessary detailed warning and error message is presented to the user. In step 75, the migration planning tool suite 2 validates contract/engagement full time equivalent FTE (i.e., an equivalent to a full time individual or employee) assumptions. The migration planning tool suite 2 validates that the overall contract or engagement (i.e., a proposed business need) full time equivalent assumptions that were made with the business need are met at steady state by utilizing the strategy results determined within the migration planning tool suite 2. A summary and feedback are provided to the user as to how the current input and resulting strategy will be applied and impact the current and new supporting individuals. In step 77, the migration planning tool suite 2 validates contract/engagement individuals or employees make-up assumptions. The overall contract or engagement individuals or employees make-up assumptions that were generated in accordance with the business need are met at steady state by utilizing the strategy results determined within the migration planning tool suite 2. A summary and feedback is provided to the user as to how the current input and resulting strategy will be applied and impact the current and new supporting individuals. In step 79, contract/engagement calendar assumptions are validated. The overall contract or engagement calendar or schedule assumptions that were made with the business need are met at steady state by utilizing the strategy results determined within the migration planning tool suite 2. A summary and feedback is provided to the user as to how the current input and resulting strategy will be applied and impact the current and new supporting individuals.

Figure 9:
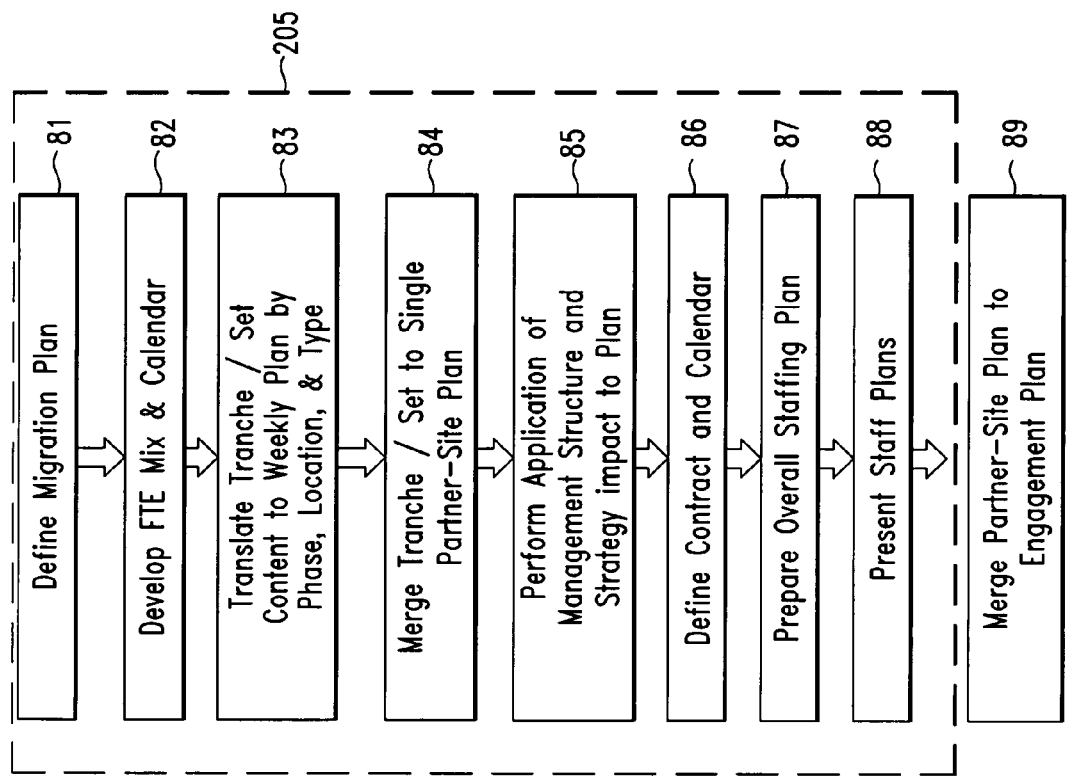
FIG. 9 is a flowchart illustrating embedded functions further detailing the define business solution step of FIG. 3, in accordance with embodiments of the present invention.

FIG. 9 is a flowchart illustrating embedded functions further detailing step 80 (i.e., define business solution) of FIG. 3, in accordance with embodiments of the present invention. In step 81, the migration planning tool suite 2 defines a transition plan. Step 81 is the primary business step that translates all data entered with additional business rules and logic to establish the overall migration strategy to be followed. The migration planning tool suite 2 allows for a unique strategy to be defined for each delivery partner and individuals or employees set grouping pair. The unique strategy includes defining when and how individuals are fulfilled, when and how individuals are trained including location and remote knowledge transfer usage, and when and how individuals become fully productive and transition to being the new support individuals or employees. By defining the transition plan, the ramping up of new individuals, the ramping down of existing individuals, as well as the knowledge transition methodology are established. In step 82, the migration planning tool suite 2 develops an FTE mix and calendar. For each delivery partner, a calendar and FTE mix to support each of the Sets determined necessary to support that business need is established. In step 83, tranche/set content is translated to a weekly plan. For each tranche or set within each Delivery partner, the generated FTE, calendar, and strategy plan is utilized to translate individuals or employees groupings defined by transition phase into a weekly plan by phase (i.e., a group of processing), location, and individuals or employees type. The phased weekly approach is generated for each individuals or employees and individuals or employees grouping to define and schedule the week over week fulfillment and phased schedule of transition. In step 84, the tranche/set is merged with a single partner-site plan. For each delivery partner, all of the weekly plans are merged into a single plan to support overall execution of migration for that partner and their required individuals to become the supporting and productive individuals. In step 85, an application of management structure and strategy step is performed. For each delivery partner, an additional application of management structure support changes as well as an additional strategy impact changes to the overall plan is developed. These additional changes are based on further details collected from the user to expand requirements that are necessary to support the business need and defined strategy. Utilizing entered, edited, and collected data as well as embedded business logic and business rules, the migration planning tool suite 2 calculates the required transitional management team as well as the steady state management team. In step 86, a contract and calendar is defined. For each delivery partner and their groupings of individuals, the resulting calendar range is calculated. The resulting calendar range will encompass the execution of all sets or trenches that have been defined to support the business solution. In step 87, an overall staffing plan is prepared. For each delivery partner, an overall staffing plan is generated. The plan is a rolled up view of each individuals or employees, individuals or employees type, and location of individuals or employees in a calendar view. The plan provides the overall transition plan and gradual movement through the phases of transition and extends beyond steady state of all individuals and individuals or employees groupings. In step 88, staff plans are presented. For each delivery partner, the user is presented with the results of the background generation of all execution strategies applied to the individuals or employees mix. The results are summarized and presented back to the user as a report. In step 89 the partner-site plan is merged to the engagement plan. All Partner or Site plans that have been developed to support the business problem are merged into a single engagement view of the plan. The rolled up calendar views of the plan are calculated for each partner and each of their groupings. A single overall view is generated. The proper summaries are presented in report format for the user. Step 205 (comprising steps 81 . . . 88), define the overall business solution process. The business solution process comprises a repeatable grouping of activities to support each phase within each tranche or set within each identified delivery partner. Most of the activities defined within this process are background executions that generate the detailed plan with a final resulting presentation of the summaries for the user.

Figure 10:
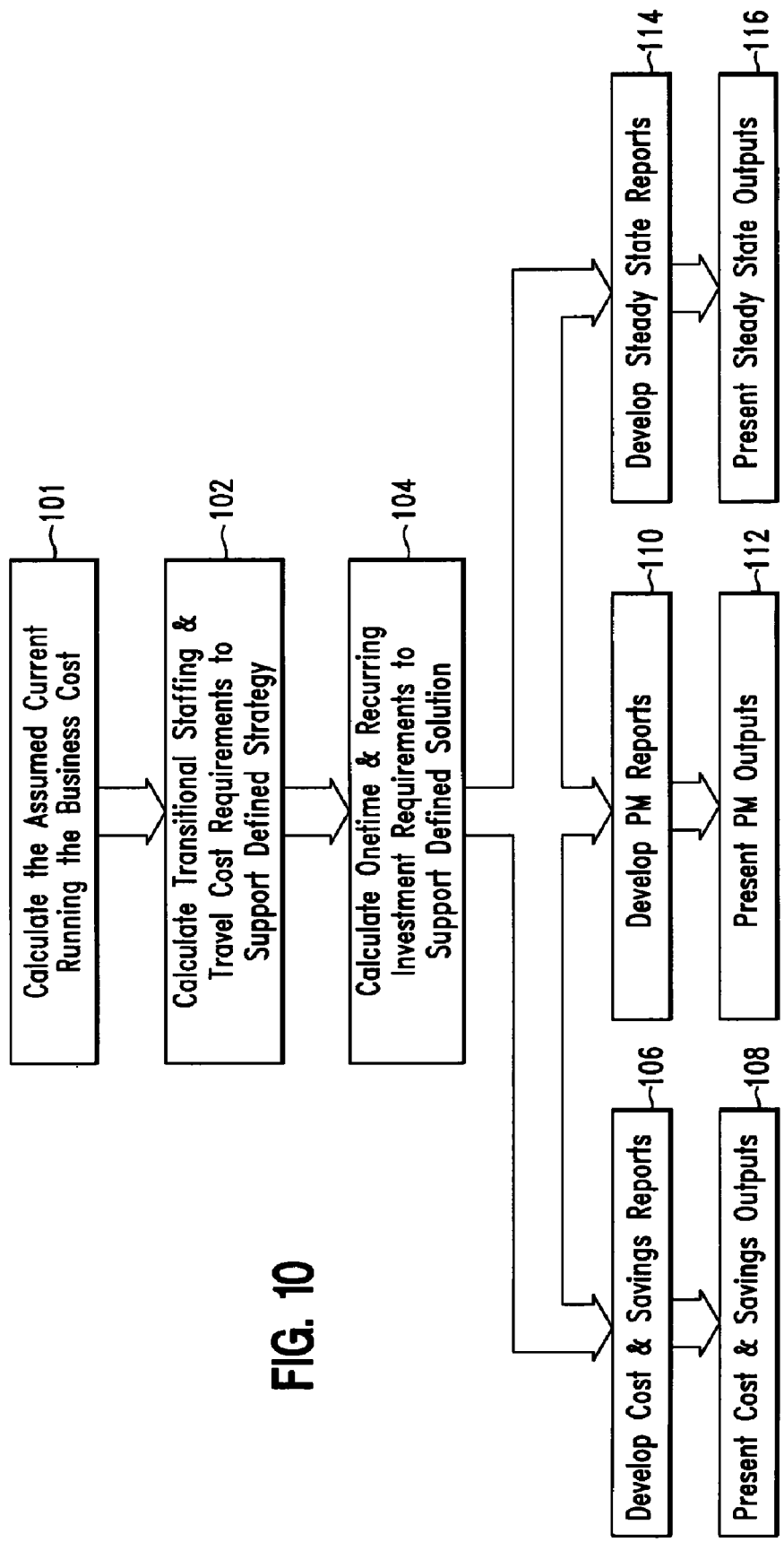
FIG. 10 is a flowchart illustrating embedded functions further detailing the build a business case step of FIG. 3, in accordance with embodiments of the present invention.

FIG. 10 is a flowchart illustrating embedded functions further detailing step 100 (i.e., build business case) of FIG. 3, in accordance with embodiments of the present invention. In step 101, the migration planning tool suite 2 calculate an assumed current running the business cost. Utilizing the entered, edited, and collected data to support the existing business model of the individuals that are currently required to support the functions of those individuals targeted to move to a new individuals or employees, a current assumed running the business cost is calculated. These costs include labor and other recurring charges to support the individuals (e.g., licensing charges, real-estate charges, office needs charges, etc). These costs are summarized and associated with the request as a subset of the attributes required to complete the transition request. In step 102, transitional staffing and travel cost requirements are calculated. Utilizing the entered, edited, and collected data as well as the overall staffing and transitional plan developed based on the defined strategy, the transitional staffing and travel cost requirements for support the defined strategy are calculated. The calculated costs are additionally defined as investment needs required to cover the support of the travel and labor needs for each new individual or employee as they transition through the migration phases. The calculated costs are summarized and associated with the request as a subset of the attributes required to complete the transition request. In step 104, onetime and recurring investment requirements are calculated. Utilizing the entered, edited, and collected data as well as the overall staffing and transitional plan developed based on the defined strategy, all of the additional onetime and recurring investment requirements to needed support defined solutions are calculated. The additional costs include management support and travel, telephone, hardware, and software requirements, cell phone, pagers, and equipment requirements, network capacity and connectivity requirements, migration management transition support staff, preplanning expenses, and any additional training remote knowledge transfer expenses. In step In step 106, cost and savings reports are generated. For each report format, cost and savings reports are generated to support the business case solution of the request with the applied defined business strategy. Cost and savings reports are defined and developed to support the development of a business case and baseline execution costs. Cost reports are developed to detail each of the identified investment line item needs in a quarterly view of contract year, quarterly view of calendar year, and monthly view. Savings reports are also developed to support a quarterly view of contract year, quarterly view of calendar year, and monthly view of the projected savings of cost to run the business comparing pre transition model during and post transition expenses. In step 108, the cost and savings reports from step 106 are presented to the user in a viewed report and printable format. All reports can be pulled from the migration planning tool suite 2 and used externally as hard or soft copies as needed. In step 110 project management reports are generated. For each Report format, project management reports are generated to support the business case solution of the request with the applied defined business strategy. The project management reports are defined and developed to support the overall project management processes including: project plan with milestones, a definition of team and the team staffing requirements, scheduling of fulfillment needs for the new partner individuals, experience level of the individuals, and expenses needs to support execution of the resulting solution. Project management reports are developed to support multiple views of the detailed data to support multiple usage of the data including staffing requests and performance report cards. The reports are developed in spread sheet and graphical format. In step 112 the project management reports generated in step 110 are presented for the user. For each report format, the project management reports are presented to the user in a viewed report and printable format. All reports may be pulled from the migration planning tool suite 2 and used externally as hard or soft copies as needed. In step 114, steady state reports are generated. For each report format, Steady State reports are generated to support the business case solution of the request with the applied defined business strategy. The steady state reports are defined and developed to support the transition of the management support from the current supporting model to the new partner model. The steady state reports include steady state staffing support and staffing mix as well as business cost expenses. The steady state cost reports are developed to detail each of the identified investment line item needs in a quarterly view of contract year, quarterly view of calendar year, and monthly view. The individuals or employees mix and staffing information are developed to support multiple views including details in spread sheets, hierarchical, and graphical format. In step 116, the steady state cost reports generated in step 114 are presented to the user. For each report format, the steady state reports are presented to the user in a viewed report and printable format. All reports can be pulled from the migration planning tool suite 2 and used externally as hard or soft copies as needed.

An implementation example for the migration planning tool suite 24 is described as follows:

A business comprising 120 individuals would like to transition the work efforts and support of the 120 individuals between two different global partners (site 1 and site 2). Data from repositories 13, 14, and 15 is entered into the computing apparatus 11 and the migration planning tool suite 2 generates the following migration plan.

Results for Site 1

Site 1 will split individuals between the current staff and the new global staff with 72 being transitioned to the global team leaving the remaining 8 individuals to support processing at the domestic location for a total of 80 out of the 120.

An average length of training for each individual or employee resulted in 275 hours.

14 Individuals travel to customer site to receive training.

58 Individuals utilized remote knowledge transfer to receive business and processing knowledge. A transition management staff that was brought onboard for fulfillment and training execution started at 2 individuals and rose to 8 individuals after 3 weeks and remained for six months. A training schedule spanned 16 weeks to reach steady for the individual's transition to this location.

Results for Site 2

Site 2 will split the individuals' between the current staff and the new global staff with 32 being transitioned to the global team leaving the remaining 8 individuals to support processing at the domestic location for a total of 40 out of the 120.

An average length of training for each individual or employee resulted in 288 hours.

13 Individuals travel to customer site to receive training.

19 individuals utilized remote knowledge transfer to receive business and processing knowledge.

A transition management staff that was brought onboard for fulfillment and training execution started at 1 individual or employee and rose to 4 after 3 weeks and remained for four months.

A training schedule spanned 12 weeks to reach steady for the individual's transition to this location.

Figure 11:
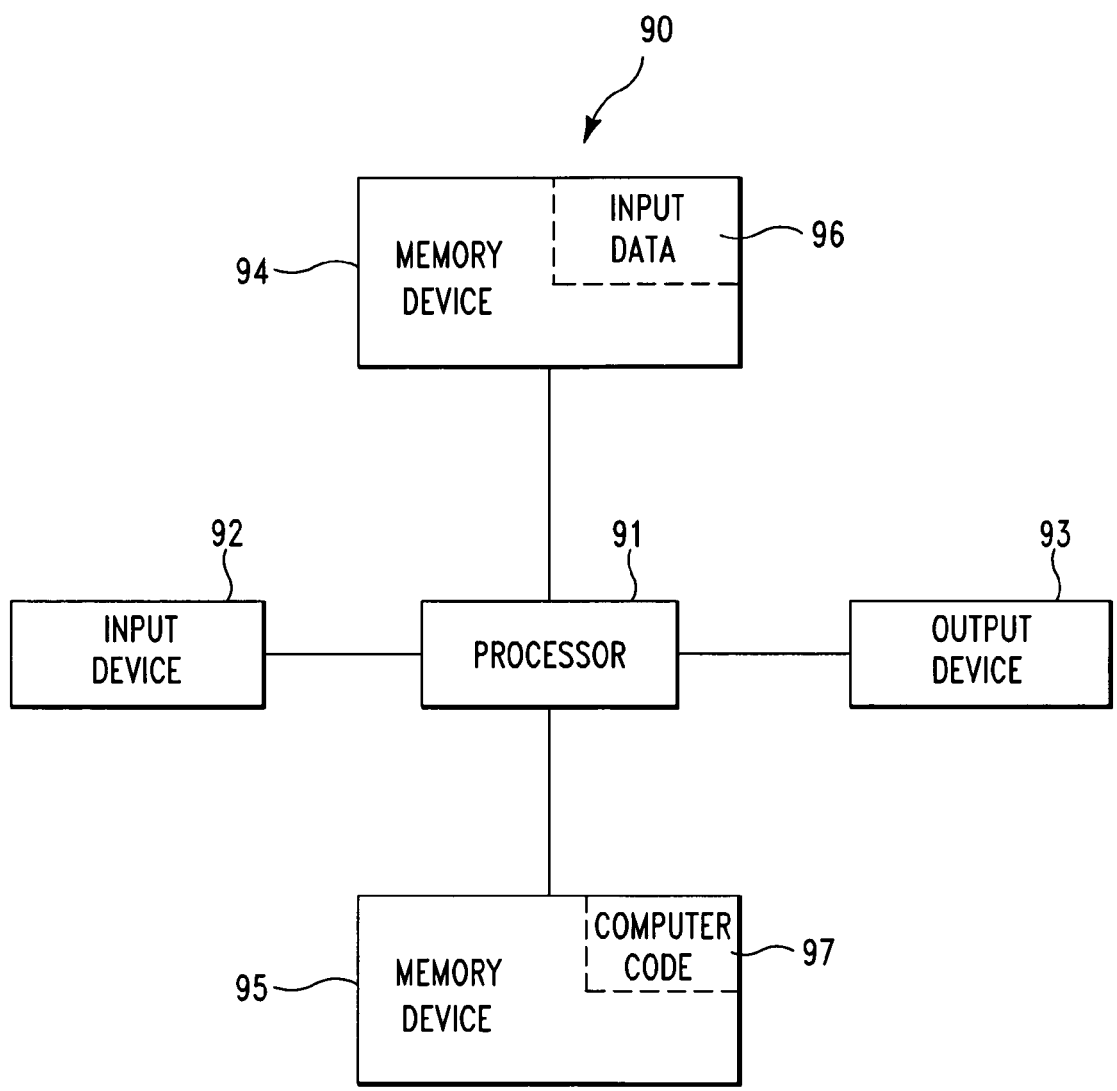
FIG. 11 illustrates a computer system for generating the migration plan of FIGS. 1-10, in accordance with embodiments of the present invention.

FIG. 11 illustrates a computer system 90 (i.e., computing apparatus 11 in FIGS. 1 and 2) for generating the migration plan 24 of FIGS. 1-10, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm used for generating the migration plan 24 of FIGS. 1-10. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 11) may comprise the algorithms of FIGS. 3-10 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for generating the migration plan 24 of FIGS. 1-10.

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A migration method, comprising:

receiving, by a computing system, a request to generate a migration plan to migrate knowledge for an entity, said computing system comprising a memory unit, said memory unit comprising a migration planning tool suite including a management tool and a planning tool;

presenting, by said migration planning tool suite to a user, questions to prepare and automatically generate a full staffing plan with cost analysis and savings summaries for a business scenario to support said to migrate knowledge, wherein said questions comprise an initial set of baseline questions grouped and presented to the user with an adjustable flow of varying questions that vary dependent upon answers and content of already presented questions, and wherein every said attribute comprises data needed based on content of already collected data from the user;

querying, by said migration planning tool suite, a business rules/edits repository for every attribute entered by the user in response to said questions, wherein said querying comprises ensuring that a format, a content, and data relationships for every said attribute meets requirements set by business rules of said migration planning tool suite;

generating, by said planning tool based on results of said querying, a strategic plan comprising a first procedure for transferring knowledge required for performing job functions comprised by a first set of individuals to a second set of individuals and a second procedure for defining a set of temporary individuals to perform a transition management process through said transferring, wherein said generating said strategic plan comprises;

calculating, by said planning tool, an assumed current cost for running said entity, wherein said calculating comprises utilizing entered, edited, and collected data to support an existing business model of the first set of individuals that are currently required to support functions of said second set of individuals, wherein said assumed current cost comprises licensing charges, real-estate charges, and office needs charges associated with said transferring said knowledge, and wherein said assumed current cost comprises a subset of said attributes;

calculating, by said planning tool, transitional staffing and travel cost requirements associated with said transferring said knowledge to said second set of individuals, wherein said transitional staffing and travel cost requirements comprise travel and labor costs for each of said second set of individuals as they transition through migration phases; and calculating, by said planning tool, onetime and recurring investment requirements, associated with said transferring said knowledge to said second set of individuals, wherein said onetime and recurring investment requirements comprise costs associated with: management support and travel; telephone, hardware, and software requirements; cell phone, pagers, and equipment requirements; network capacity and connectivity requirements; migration management transition support staff; and preplanning expenses;

generating, by said management tool, an allocation plan for first allocating said set of temporary individuals to said entity for said transition management process and second allocating said second set of individuals for said transferring;

generating, by said management tool, a ramping down plan for ramping down to close out said first set of individuals and said set of temporary individuals based on data extracted from a previous ramping down plan;

processing, by said migration planning tool suite, said request to migrate knowledge by;
    generating a tranche comprising a group of said second set of individuals that have been collected into a similar migration strategy and schedule;
    translating said tranche to a weekly plan;
    merging said tranche with a single partner-site plan;
    defining a contract and a calendar associated with said tranche;
    calculating transitional staffing and travel cost requirements for said second set of individuals;

generating, by a computer processor of said computing system executing said planning tool, said migration plan for supporting said entity based on said strategic plan, said allocation plan, results of said processing, and said ramping down plan, said migration plan comprising a procedure for allocating said second set of individuals for supporting said entity.

2. The method of claim 1, wherein said first set of individuals comprises local individuals from a local geographical area, and wherein said second set of individuals comprises remote individuals from a remote geographical area relative to said local geographical area.

3. The method of claim 1, wherein said generating, said migration plan is further based on data retrieved from previous migration plans generated by said planning tool.

4. The method of claim 1, wherein said generating, said migration plan is further based on data comprising business rules for said entity.

5. The method of claim 1, wherein said data comprising business rules for said entity are embedded within said planning tool.

6. The method of claim 1, wherein said generating said migration plan comprises generating a staffing plan for hiring and employing said second set of individuals.

7. The method of claim 1, wherein said staffing plan comprises a cost analysis and savings summary related to said hiring and said employing said second set of individuals.

8. A computing system comprising a computer processor coupled to a computer-readable memory unit, said memory unit comprising a migration planning tool suite including a management tool, a planning tool, and instructions that when executed by the computer processor implement a migration planning method, said method comprising:

receiving, by said computing system, a request to generate a migration plan to migrate knowledge for an entity;

presenting, by said migration planning tool suite to a user, questions to prepare and automatically generate a full staffing plan with cost analysis and savings summaries for a business scenario to support said to migrate knowledge, wherein said questions comprise an initial set of baseline questions grouped and presented to the user with an adjustable flow of varying questions that vary dependent upon answers and content of already presented questions, and wherein every said attribute comprises data needed based on content of already collected data from the user;

querying, by said migration planning tool suite, a business rules/edits repository for every attribute entered by the user in response to said questions, wherein said querying comprises ensuring that a format, a content, and data relationships for every said attribute meets requirements set by business rules of said migration planning tool suite;

generating, by said planning tool based on results of said querying, a strategic plan comprising a first procedure for transferring knowledge required for performing job functions comprised by a first set of individuals to a second set of individuals and a second procedure for defining a set of temporary individuals to perform a transition management process through said transferring, wherein said generating said strategic plan comprises;
    calculating, by said planning tool, an assumed current cost for running said entity, wherein said calculating comprises utilizing entered, edited, and collected data to support an existing business model of the first set of individuals that are currently required to support functions of said second set of individuals, wherein said assumed current cost comprises licensing charges, real-estate charges, and office needs charges associated with said transferring said knowledge, and wherein said assumed current cost comprises a subset of said attributes;
    calculating, by said planning tool, transitional staffing and travel cost requirements associated with said transferring said knowledge to said second set of individuals, wherein said transitional staffing and travel cost requirements comprise travel and labor costs for each of said second set of individuals as they transition through migration phases; and
    calculating, by said planning tool, onetime and recurring investment requirements, associated with said transferring said knowledge to said second set of individuals, wherein said onetime and recurring investment requirements comprise costs associated with: management support and travel; telephone, hardware, and software requirements; cell phone, pagers, and equipment requirements; network capacity and connectivity requirements; migration management transition support staff; and preplanning expenses;

generating, by said management tool, an allocation plan for first allocating said set of temporary individuals to said entity for said transition management process and second allocating said second set of individuals for said transferring;

generating, by said management tool, a ramping down plan for ramping down to close out said first set of individuals and said set of temporary individuals based on data extracted from a previous ramping down plan;

processing, by said migration planning tool suite said request to migrate knowledge by;
    generating a tranche comprising a group of said second set of individuals that have been collected into a similar migration strategy and schedule;
    translating said tranche to a weekly plan;
    merging said tranche with a single partner-site plan;

defining a contract and a calendar associated with said tranche;

calculating transitional staffing and travel cost requirements for said second set of individuals;

generating, by said computer processor executing said planning tool, said migration plan for supporting said entity based on said strategic plan, said allocation plan, results of said processing, and said ramping down plan, said migration plan comprising a procedure for allocating said second set of individuals for supporting said entity.

9. The computing system of claim 8, wherein said first set of individuals comprises local individuals from a local geographical area, and wherein said second set of individuals comprises remote individuals from a remote geographical area relative to said local geographical area.

10. The computing system of claim 8, wherein said generating, said migration plan is further based on data retrieved from previous migration plans generated by said planning tool.

11. The computing system of claim 8, wherein said generating, said migration plan is further based on data comprising business rules for said entity.

12. The computing system of claim 11, wherein said data comprising business rules for said entity are embedded within said planning tool.

13. The computing system of claim 8, wherein said generating said migration plan comprises generating a staffing plan for hiring and employing said second set of individuals.

14. The computing system of claim 13, wherein said staffing plan comprises a cost analysis and savings summary related to said hiring and said employing said second set of individuals.

15. A computer program product, comprising a tangible computer readable storage device including computer readable program code embodied therein, said computer readable program code comprising an algorithm adapted to implement a migration planning method within a computing system, said method comprising:

receiving, by said computing system, a request to generate a migration plan to migrate knowledge for an entity;

presenting, by said migration planning tool suite to a user, questions to prepare and automatically generate a full staffing plan with cost analysis and savings summaries for a business scenario to support said to migrate knowledge, wherein said questions comprise an initial set of baseline questions grouped and presented to the user with an adjustable flow of varying questions that vary dependent upon answers and content of already presented questions, and wherein every said attribute comprises data needed based on content of already collected data from the user;

querying, by said migration planning tool suite, a business rules/edits repository for every attribute entered by the user in response to said questions, wherein said querying comprises ensuring that a format, a content, and data relationships for every said attribute meets requirements set by business rules of said migration planning tool suite;

generating, by said planning tool based on results of said querying, a strategic plan comprising a first procedure for transferring knowledge required for performing job functions comprised by a first set of individuals to a second set of individuals and a second procedure for defining a set of temporary individuals to perform a transition management process through said transferring, wherein said generating said strategic plan comprises;

calculating, by said planning tool, an assumed current cost for running said entity, wherein said calculating comprises utilizing entered, edited, and collected data to support an existing business model of the first set of individuals that are currently required to support functions of said second set of individuals, wherein said assumed current cost comprises licensing charges, real-estate charges, and office needs charges associated with said transferring said knowledge, and wherein said assumed current cost comprises a subset of said attributes;

calculating, by said planning tool, transitional staffing and travel cost requirements associated with said transferring said knowledge to said second set of individuals, wherein said transitional staffing and travel cost requirements comprise travel and labor costs for each of said second set of individuals as they transition through migration phases; and calculating, by said planning tool, onetime and recurring investment requirements, associated with said transferring said knowledge to said second set of individuals, wherein said onetime and recurring investment requirements comprise costs associated with: management support and travel; telephone, hardware, and software requirements; cell phone, pagers, and equipment requirements; network capacity and connectivity requirements; migration management transition support staff; and preplanning expenses;

generating, by said management tool, an allocation plan for first allocating said set of temporary individuals to said entity for said transition management process and second allocating said second set of individuals for said transferring;

generating, by said management tool, a ramping down plan for ramping down to close out said first set of individuals and said set of temporary individuals based on data extracted from a previous ramping down plan;

processing, by said migration planning tool suite said request to migrate knowledge by;

generating a tranche comprising a group of said second set of individuals that have been collected into a similar migration strategy and schedule;

translating said tranche to a weekly plan;

merging said tranche with a single partner-site plan;

defining a contract and a calendar associated with said tranche;

calculating transitional staffing and travel cost requirements for said second set of individuals;

generating, by a computer processor of said computing system executing said planning tool, said migration plan for supporting said entity based on said strategic plan, said allocation plan, results of said processing, and said ramping down plan, said migration plan comprising a procedure for allocating said second set of individuals for supporting said entity.

16. The computer program product of claim 15, wherein said first set of individuals comprises local individuals from a local geographical area, and wherein said second set of individuals comprises remote individuals from a remote geographical area relative to said local geographical area.

17. The computer program product of claim 15, wherein said generating, said migration plan is further based on data retrieved from previous migration plans generated by said computer readable program code.

18. The computer program product of claim 15, wherein said generating, said migration plan is further based on data comprising business rules for said entity.

19. The computer program product of claim 18, wherein said data comprising business rules for said entity are embedded within said computer readable program code.

20. The computer program product of claim 15, wherein said generating said migration plan comprises generating a staffing plan for hiring and employing said second set of individuals.

21. The computer program product of claim 20, wherein said staffing plan comprises a cost analysis and savings summary related to said hiring and said employing said second set of individuals.

22. A process for integrating computing infrastructure, comprising integrating computer-readable code into a computing system, wherein the code in combination with the computing system is capable of performing a migration planning method within a computing system, said method comprising:
  receiving, by said computing system, a request to generate a migration plan to migrate knowledge for an entity;
  presenting, by said migration planning tool suite to a user, questions to prepare and automatically generate a full staffing plan with cost analysis and savings summaries for a business scenario to support said to migrate knowledge, wherein said questions comprise an initial set of baseline questions grouped and presented to the user with an adjustable flow of varying questions that vary dependent upon answers and content of already presented questions, and wherein every said attribute comprises data needed based on content of already collected data from the user;
  querying, by said migration planning tool suite, a business rules/edits repository for every attribute entered by the user in response to said questions, wherein said querying comprises ensuring that a format, a content, and data relationships for every said attribute meets requirements set by business rules of said migration planning tool suite;
  generating, by said planning tool based on results of said querying, a strategic plan comprising a first procedure for transferring knowledge required for performing job functions comprised by a first set of individuals to a second set of individuals and a second procedure for defining a set of temporary individuals to perform a transition management process through said transferring, wherein said generating said strategic plan comprises;
    calculating, by said planning tool, an assumed current cost for running said entity, wherein said calculating comprises utilizing entered, edited, and collected data to support an existing business model of the first set of individuals that are currently required to support functions of said second set of individuals, wherein said assumed current cost comprises licensing charges, real-estate charges, and office needs charges associated with said transferring said knowledge, and wherein said assumed current cost comprises a subset of said attributes;
    calculating, by said planning tool, transitional staffing and travel cost requirements associated with said transferring said knowledge to said second set of individuals, wherein said transitional staffing and travel cost requirements comprise travel and labor costs for each of said second set of individuals as they transition through migration phases; and
    calculating, by said planning tool, onetime and recurring investment requirements, associated with said transferring said knowledge to said second set of individuals, wherein said onetime and recurring investment requirements comprise costs associated with: management support and travel; telephone, hardware, and software requirements; cell phone, pagers, and equipment requirements; network capacity and connectivity requirements; migration management transition support staff; and preplanning expenses;
  generating, by said management tool, an allocation plan for first allocating said set of temporary individuals to said entity for said transition management process and second allocating said second set of individuals for said transferring;
  generating, by said management tool, a ramping down plan for ramping down to close out said first set of individuals and said set of temporary individuals based on data extracted from a previous ramping down plan;
  processing, by said migration planning tool suite said request to migrate knowledge by;
    generating a tranche comprising a group of said second set of individuals that have been collected into a similar migration strategy and schedule;
    translating said tranche to a weekly plan;
    merging said tranche with a single partner-site plan;
    defining a contract and a calendar associated with said tranche;
    calculating transitional staffing and travel cost requirements for said second set of individuals;
  generating, by a computer processor of said computing system executing said planning tool, said migration plan for supporting said entity based on said strategic plan, said allocation plan, results of said processing, and said ramping down plan, said migration plan comprising a procedure for allocating said second set of individuals for supporting said entity.

23. The process of claim 22, wherein said first set of individuals comprises local individuals from a local geographical area, and wherein said second set of individuals comprises remote individuals from a remote geographical area relative to said local geographical area.

24. The process of claim 22, wherein said generating, said migration plan is further based on data retrieved from previous migration plans generated by said computer readable program code.

25. The process of claim 22, wherein said generating, said migration plan is further based on data comprising business rules for said entity.

26. The process of claim 25, wherein said data comprising business rules for said entity are embedded within said computer readable program code.

27. The process of claim 22, wherein said generating said migration plan comprises generating a staffing plan for hiring and employing said second set of individuals.

28. The process of claim 27, wherein said staffing plan comprises a cost analysis and savings summary related to said hiring and said employing said second set of individuals.

* * * * *